Figure 3:
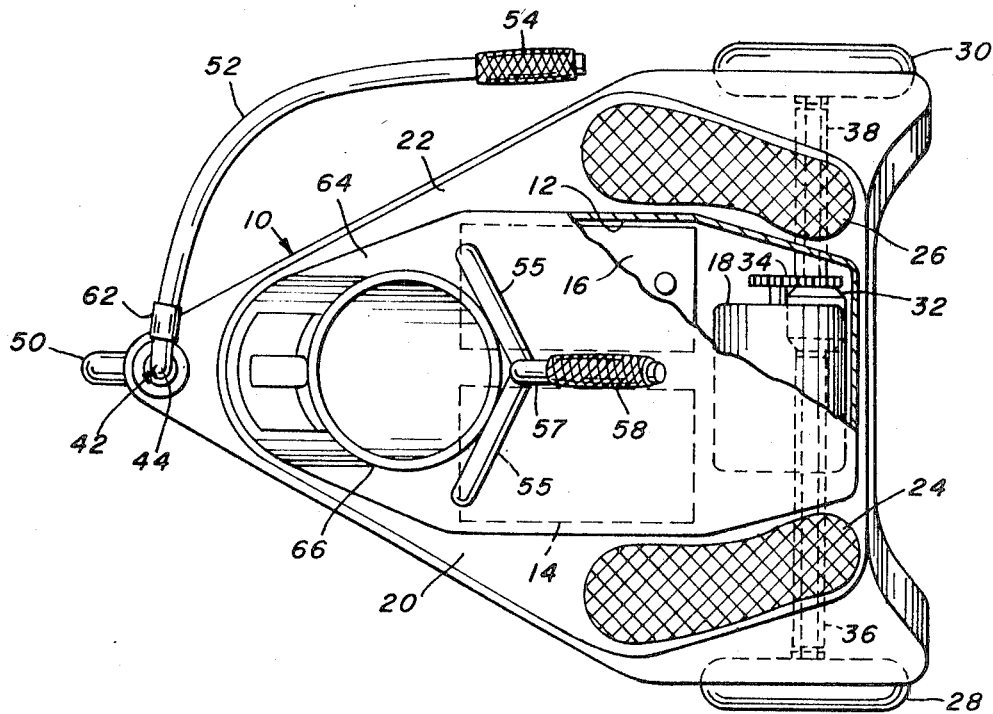

United States Patent
Moulton

[15] 3,648,795
[45] Mar. 14, 1972

[54] THREE-WHEELED ELECTRICALLY PROPELLED CART

[72] Inventor: H. Douglass Moulton, 234 Foxhurst Drive, Pittsburgh, Pa. 15238

[22] Filed: June 8, 1970

[21] Appl. No.: 44,185

[52] U.S. Cl. ............................ 180/27, 180/65 R, 280/DIG. 5
[51] Int. Cl. ........................................................ B62d 61/06
[58] Field of Search ............... 180/27, 25, 65, 26, 13, 19, 180/6.2; 280/DIG. 5, 92

[56] References Cited

UNITED STATES PATENTS

| | | | |
|---|---|---|---|
| 631,438 | 8/1899 | Plass | 180/27 |
| 1,164,863 | 12/1915 | Potter et al. | 180/27 |
| 2,965,186 | 12/1960 | Burns | 180/27 X |
| 2,973,048 | 2/1961 | Jensen | 180/27 |
| 3,006,428 | 10/1961 | Westmont | 180/27 X |
| 3,099,326 | 7/1963 | Weigel et al. | 180/65 X |
| 3,162,261 | 12/1964 | Everroad | 180/26 |
| 3,312,300 | 5/1967 | Jones | 180/19 |

*Primary Examiner*—Kenneth H. Betts
*Attorney*—Brown, Murray, Flick & Peckham

[57] ABSTRACT

A three-wheeled, self-propelled cart characterized in that the operator stands on the cart, straddling a drive motor for two drive wheels while holding onto an upstanding post with one hand and grasping a tongue-type steering pole with the other hand. The steering pole is connected to the third wheel and is curved outwardly and around the aforesaid post such that the operator's hands will be separated; while movement of the steering pole inwardly or outwardly will cause the third wheel to pivot about a vertical axis to steer the vehicle. A golf bag or other receptacle can be carried on the vehicle ahead of the upstanding post and is usually secured to the post by a strap or the like.

8 Claims, 4 Drawing Figures

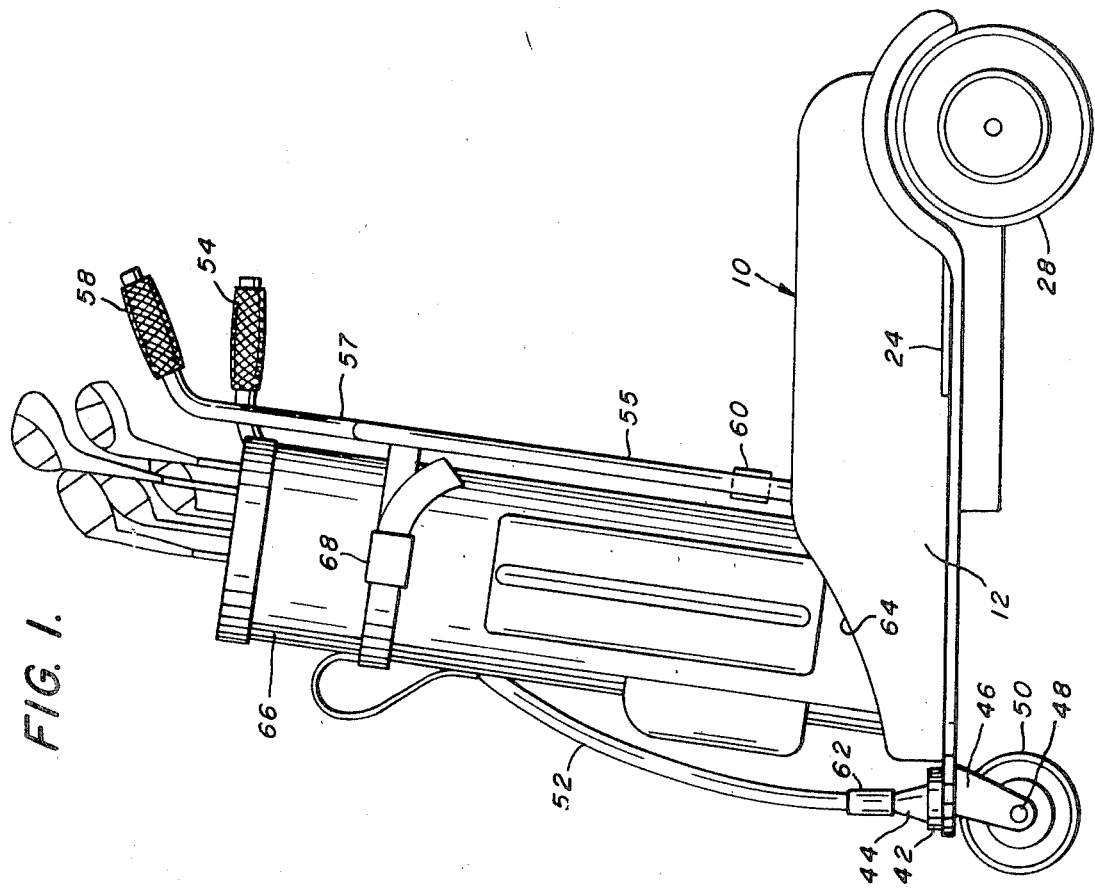

INVENTOR.
H. DOUGLASS MOULTON
By
Brown, Murray, Flick & Peckham
Attorneys

THREE-WHEELED ELECTRICALLY PROPELLED CART

BACKGROUND OF THE INVENTION

As is known, there is a large need for small driven vehicles which can carry only a single man and a small amount of relatively light cargo. Such vehicles can be used, for example, by messengers, for parts delivery in large industrial plants, or as golf carts. The usual golf cart will accommodate at least two individuals and, as a consequence, is relatively large and bulky, at least too large to be carried in the trunk of an automobile. This means that most golf carts are owned by golf courses or country clubs and rented to players. Furthermore, the size of a conventional golf cart, which is usually battery powered, necessitates the use of a relatively large drive motor and other heavy components, including the batteries. As a result, the initial cost of such carts is high as is the rental which must be charged for their use. Hence, there is a need for a lightweight golf cart which will accommodate a single golfer, which can be bought or rented cheaply, and which can be folded and placed in an automobile trunk if desired whereby the golfer can buy his own cart and need not rent one each time he plays.

SUMMARY OF THE INVENTION

In accordance with the present invention, a lightweight, low-cost cart is provided comprising a body portion formed from steel, molded fiber glass or the like and having two drive wheels at the rear and a single steerable wheel at the front. Centrally carried on the body are one or more batteries and a direct current drive motor, preferably connected to the two drive wheels through a differential. In using the cart, the operator places his feet on two footpads on either side of the batteries and drive motor, and holds onto an upstanding post anchored to the body at the forward portion of the vehicle. Steering is accomplished by means of a tongue-type steering pole connected to the third or front wheel and curved outwardly and around the aforesaid post such that the operator can hold onto the post with one hand and use his other hand to move the steering pole inwardly or outwardly and thereby steer the vehicle.

When the vehicle is used as a golf cart, a golf bag is secured, in an upright position, to the aforesaid post and rests on the forward portion of the vehicle body adjacent the third, steering wheel. Both the stationary post and the aforesaid steering pole can be provided with a pivoted joint or can be removable in order that the cart can be picked up and placed in an automobile trunk.

Figure 4:
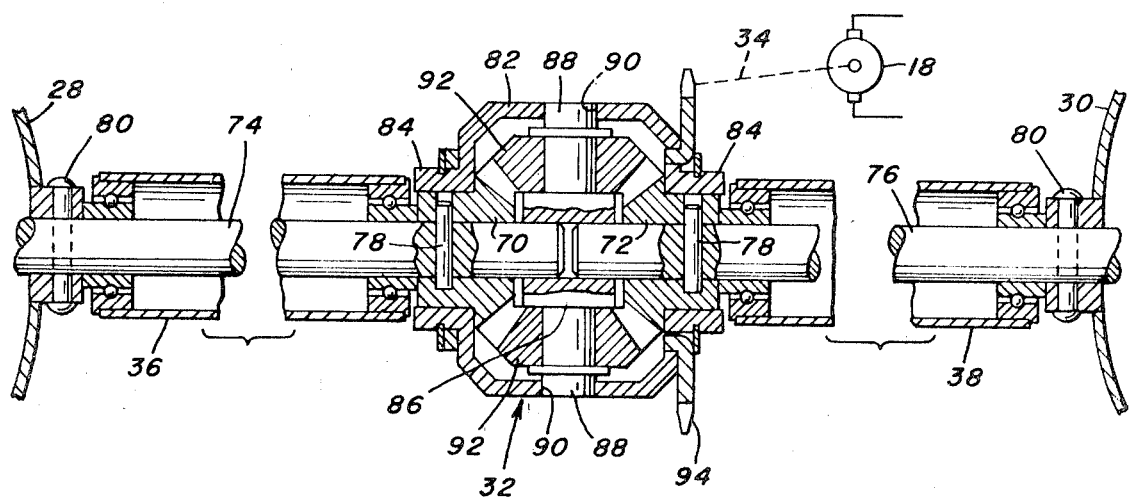

The above and other objects and features of the invention will become apparent from the following detailed description taken in connection with the accompanying drawings which form a part of this specification, and in which:

FIG. 1 is a side view of the cart of the invention;
FIG. 2 is an end view of the cart of the invention;
FIG. 3 is a top view of the cart of the invention; and
FIG. 4 is a cross-sectional view of one type of differential drive which can be used with the vehicle of the invention.

With reference now to the drawings, and particularly to FIGS. 1—3, the cart shown includes a body section 10 preferably formed in one piece from fiber glass or the like. However, the body can also be formed from sheet metal or other similar material, if desired. As perhaps best shown in FIGS. 2 and 3, the body 10 includes a central upstanding housing 12 which defines a cavity for receiving two storage batteries 14 and 16. The batteries 14 and 16 can be connected in parallel or series through a speed control rheostat, hereinafter described, to a direct current drive motor 18 also housed within the cavity 12. As best shown in FIG. 3, on either side of the cavity 12 are running boards 20 and 22 provided with footpads 24 and 26, respectively, on which the operator stands. At the rear of the vehicle are two drive wheels 28 and 30 connected through a differential 32 (FIG. 2) and a chain and sprocket arrangement 34 to the drive motor 18. Suitable means, not shown, are provided for holding the various parts within the cavity 12 in position. As best shown in FIG. 2, the differential 32 is connected to the wheels 28 and 30 through axles housed within axle housings 36 and 38 extending through the walls of the cavity 12 and supported by bushings 40 extending downwardly from the body 10.

At the forward end of the body 10, as best shown in FIGS. 1 and 3, is an opening fitted with a bushing 42 which receives the shank portion 44 of a fork 46. An axle 48 extends between the opposite legs of the fork 46 and supports a third, steerable wheel 50. The shank portion 44 of the fork 46, in turn, is connected to a curved tongue-type steering pole 52 which curves outwardly and to the right as shown in FIG. 3. The upper end of the steering pole 52 is provided with a handle grip 54 such that it may be gripped by one hand of the operator and moved inwardly or outwardly as viewed in FIG. 3 to pivot the wheel 50 about a vertical axis and thereby steering the vehicle.

Extending upwardly from the forward portion of the body 10 is a post 56 provided with braces 55. The post 56, in turn, is connected to a handle 57 provided with a handle grip 58 grasped by the other or left-hand of the operator. Either the handle grip 54 or handle grip 58 is rotatable and connected to a rheostat which, in turn, controls the supply of power to the motor 18 and, hence, the speed of the vehicle.

The arrangement shown in the drawings is suitable for a right-handed operator since the handle grip 54 will be grasped by the right hand and the handle grip 58 by the left hand. However, in the case of a left-handed operator, the steering pole 52 may be curved to the left as viewed in FIG. 3. In order that the device may be collapsed and inserted into an automobile trunk, the post 56 is provided with a quick-disconnect coupling 60 adjacent the body 10. Braces 55 are fitted into sockets in the body 10 and are removable therefrom. Similarly, the steering pole 52 is provided with a quick-disconnect coupling 62 in order that the pole 52, and the post 56 may be removed when the vehicle is stored in an automobile trunk or other enclosure. Ahead of the bifurcated post 56 is a storage area 64 on which a golf bag 66, for example, can rest. The golf bag, in turn, is secured to the post 56 by means of a strap 68.

The details of the differential drive arrangement of the invention are shown in FIG. 4. It comprises two miter gears 70 and 72 secured to the adjacent inner ends of axles 74 and 76 by means of pins 78. The opposite ends of the axles 74 and 76 are secured to the wheels 28 and 30 as by pins 80. A housing 82 surrounds the miter gears 70 and 72 and has hubs 84 rotatably mounted on the ends of the miter gears 70 and 72 whereby the housing 84 is rotatable about the coaxial central axes of the axles 74 and 76. A bushing member 86 is carried by the inner ends of the axles 74, 76 and is freely rotatable thereon. The bushing member 86 has oppositely-extending shafts 88 with ends engaged in openings 90 provided in the housing 82. Consequently, the housing 82 and the bushing member 86 are connected and rotate in unison about the axles 74 and 76. Shafts 88 carry idler miter gears 92, each of which is disposed in meshing engagement with the miter gears 70, 72. The idler miter gears 92 are rotatable about the shafts 88 of the bushing member 86. As will be appreciated, the driven sprocket 94 is secured to the housing 82 and rotates the same as the motor 18, connected to the sprocket 94 through chain drive 34, rotates.

As the driven sprocket 94 rotates, the housing 82, the idler miter gears 92, the miter gears 70, 72 and the axles 74, 76 will rotate in unison to drive the wheels 28 and 30. If the vehicle is being driven forward in a substantially straight line path of travel, the wheels 28 and 30 will rotate at the same speed. However, when the vehicle is turning, the wheel on the inside of the turn will roll over a shorter distance than the wheel on the outside of the turn. The idler miter gears 92 permit the axles 74, 76 to be driven at different angular velocities when the vehicle is executing a turn. Consequently, the angular velocities of the wheels are automatically adjusted to compensate for the difference in the length of the circumferential path of travel of each wheel. Therefore, the wheels will not skid during a turn and are subjected to a minimum amount of wear.

In certain cases, it may be possible to eliminate the differential arrangement shown in FIG. 4; however in most instances the differential will be preferred.

In the operation of the vehicle of the invention, the operator simply stands on the footpads 24 and 26 and grasps the two handle grips 54 and 58, one of which is rotatable and connected to a rheostat as mentioned above. In order to start the vehicle, the rotatable grip is turned, whereupon power is supplied from the batteries 16 to the motor 18 by suitable control circuitry, not shown. The type of motor used and the motor control, therefore, will be similar to those used for other electric vehicles.

Instead of riding the cart, it is also possible to tilt the forward wheel 50 upwardly about the drive wheels with the operator guiding the cart while walking behind or to the side of it. This can be done with or without power. Without power, the operator will pull or push the vehicle. With power, he will control the device by a rotatable handle grip 54 connected to a rheostat as mentioned above. This rheostat, of course, can be replaced by a squeeze-type grip if desired.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that instead of using an electric motor drive, a gasoline motor could be used equally as well. Furthermore, a direct gear drive can be used in some cases rather than a differential.

I claim as my invention:

1. A three-wheeled vehicle comprising a body portion having two drive wheels at one end thereof and a single steerable wheel mounted to rotate about a generally vertical axis at the other end thereof, an upstanding post at said other end of said vehicle adapted to be grasped by one hand of an operator, a tonguelike steering pole connected to said single steerable wheel and curved around said post to be grasped by the other hand of the operator such that movement of the steering pole inwardly or outwardly with respect to said post will pivot said steerable wheel about its generally vertical axis to steer said vehicle, motor means carried on said body centrally thereof and drivingly connected to said drive wheels, and means on either side of said motor means for receiving the feet of an operator standing in an upright position and grasping with his two hands said upright post and said steering pole, respectively.

2. The vehicle of claim 1 wherein said motor means is drivingly connected to said drive wheels through a differential and a pair of axles.

3. The vehicle of claim 1 wherein said motor means comprises a direct current electric motor, and including battery means for said motor carried on said body between said means for receiving the feet of an operator.

4. The vehicle of claim 3 including a rotatable element adapted to be grasped by the hand of an operator and connected to a rheostat for varying the speed of said electric motor.

5. The vehicle of claim 1 including a storage area on the vehicle ahead of said post for supporting cargo to be carried by said vehicle.

6. The vehicle of claim 1 wherein said upright post and said steering pole are fastened to said body through connections which permit the pole and post to be folded downwardly whereby the vehicle can be stored in a compact space.

7. The three-wheeled vehicle of claim 1 wherein said body portion is formed from fiber glass.

8. A three-wheeled vehicle comprising a body portion having two drive wheels at one end thereof and a single steerable wheel mounted to rotate about a generally vertical axis at the other end thereof, an upstanding post at said other end of said vehicle adapted to be grasped by one hand of an operator, a steering pole connected to said single steerable wheel and extending upwardly adjacent said post to be grasped by the other hand of the operator such that rotational movement of the steering pole about a generally vertical axis will pivot said steerable wheel to steer said vehicle, motor means carried on said body centrally thereof and drivingly connected to said drive wheels, means on either side of said motor means for receiving the feet of an operator standing in an upright position and grasping with his two hands said upright post and said steering pole, respectively, and a storage area on the vehicle ahead of said post for supporting cargo to be carried by said vehicle.

* * * * *